3,502,378
ROLLER BEARINGS WITH CYLINDRICAL ROLLERS

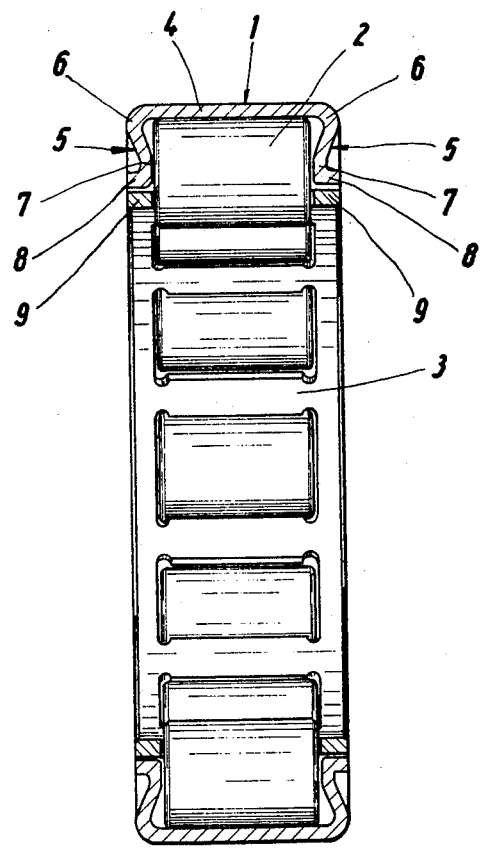

Leo Linz, Herzogenaurach, Germany, assignor to Industriewerk Schaeffler OHG, Herzogenaurach, Germany, a corporation of Germany
Filed Apr. 3, 1968, Ser. No. 718,580
Claims priority, application Germany, Apr. 15, 1967, J 16,377
Int. Cl. F16c *33/58*
U.S. Cl. 308—213                                         2 Claims

ABSTRACT OF THE DISCLOSURE

A roller bearing with cylindrical rollers comprising a thin-walled outer race formed without cutting provided with abutment flanges on both sides and a plurality of cylindrical rollers guided on the said race.

PRIOR ART

Various types of roller bearings of this nature are known and are widely used for needle bearings in which the rollers may be disposed in a cage or may be closely adjacent to one another. In either case, the ends of the rollers are spaced a specific distance from the point where the side flange meets the roller raceway of the outer race for construction reasons. This arrangement is particularly necessary for outer races formed without cutting since it is not possible to form a flange sufficiently accurate at this angular point that the roller ends could safely roll thereon. On the contrary, it is at this point where there is always a specific arc present due to technical manufacturing problems which arc makes it impossible for the roller ends to abut against this angular point since it would result in increased stresses on the roller ends and on the corresponding contact points of the race.

Attempts have been made to provide roller bearings with cylindrical rollers whose ends are forced as far as possible from this area of the race. To avoid these difficulties, attempts have been made to provide a radius on the ends of the rollers in the transitional area of the rollers where the cylindrical surface meets the end surfaces, which radius was slightly larger than the radius at the transitional area of the race. However, these radii differ in races formed without cutting by insignificant degrees and therefore, this type of construction did not result in any satisfactory solution.

OBJECTS OF THE INVENTION

It is an object of the invention to provide a novel bearing with cylindrical rollers which avoids excessive stresses on the rollers and the resulting problems.

This and other objects and advantages of the invention will become obvious from the following detailed description.

THE INVENTION

The bearing of the invention is comprised of a thin-walled outer race formed without cutting by drawing from sheet metal and provided with a Z-shaped abutment flange on either end and a plurality of cylindrical rollers guided thereon, the profile of the flanges being such that (a), their transition point into the cylindrical part of the outer race is displaced axially outside with respect to the roller ends, (b) their radial inner parts are spaced from each other a distance which is slightly greater than the length of the rollers and (c) they have flanges formed on their bores which are directed axially outward from the bearing.

Such a construction removes the radius of the transition point from the cylindrical portion of the race into the abutment flanges away from any stress area since it is outwardly directed in relation to the roller ends. By this and the fact that the radially inner parts of the abutment flanges are spaced apart from each other a distance slightly greater than the length of the rollers, the ends of the rollers are reliably prevented from coming into contact with this radius of the race during operating of the bearing.

The abutment flanges of the said bearing not only guarantee axial guidance of the rollers but may also guide the rollers in an axial parallel direction as is usual in bearings with races formed without cutting and cylindrical rollers provided the ratio of roller diameter to roller length is suitable. Moreover, the flanges or the collars formed on the bores of the abutment flanges provide additional reinforcement of the abutment flanges.

It is well known that outer races formed without cutting possess certain non-concentric and other shapes depending upon the type of structure and the said outer races only attain their final dimension and required concentricity upon being pressed into a bore. However, to accomplish this, the abutment flanges of such an outer race must not impart too great a radical rigidity for they must be flexible within certain limits for pressing into the bore. Due to the Z shape of the abutment flanges, they offer an especially certain guarantee that they are able to assure a certain reduction of the cylindrical portion of the race without undergoing a detrimental deformation.

An additional advantage of the Z-shape of the abutment flanges on the side is that spaces are formed laterally to the rollers for storage of lubricants which spaces make it possible to substantially prolong the times between lubrications.

In a modification of the bearing of the invention, the rollers may be arranged for guidance and/or mounting in a cage which is concentrically guided on the collar of the abutment flanges. When using a cage in a roller bearing, it is known that a concentric guidance of the cage has to be provided. Basically, guidance of the cage on the rollers is possible, but this involves well-known disadvantages. In the bearing of the invention having Z-shaped abutment flanges, the axially outwardly directed flanges or collars serve as guiding surfaces for the cage which is particularly advantageous since no additional construction costs are required for this feature.

Referring now to the drawing:

The figure is a longitudinal view of one bearing embodiment of the invention.

The illustrated roller bearing of the invention is comprised of an outer race, cylindrical rollers 2 guided thereon and cage 3 accommodating the said rollers 2. The outer race 1 consists of a cylindrical portion 4 provided at either end with Z-shaped abutment flanges 5. The points 6, where the cylindrical portion 4 of the race merges into the side abutment flanges 5 at a radius, are in axially outward direction in relation to the roller ends. The inner radial parts 7 of the abutment flanges are spaced from each other a distance slightly greater than the length of the rollers 2. The abutment flanges 5 are also provided on their bores with flanges or collars 8 arranged in axial outward relation to the bearing.

The concentric guidance of the cage 3 can be effected by making the outer diameter of the end rings 9 of cage 3 only slightly smaller than the inner diameter of collars 8 whereby the end rings 9 are guided in a sliding motion on the collars 8.

The drawing clearly shows that the said construction allows the rollers 2 to roll along their entire length on a perfectly cylindrical race without the roller ends coming in contact with the transition point of the cylindrical part of the race into the abutment flanges. Moreover, hollow spaces are formed by the end surfaces of the rollers and the abutment flange at point 6 which serve as storage for lubricants.

Various modifications of the bearing of the invention may be made without departing from the spirit or scope thereof.

I claim:

1. A bearing comprising a thin-walled outer race formed by drawing from sheet metal and provided with a Z-shaped abutment flange on either end and a plurality of cylindrical rollers guided thereon, the profile of the flanges being such that (a) their transition point into the cylindrical part of the outer race is displaced axially outside with respect to the roller ends, (b) their radial inner points are spaced from each other a distance which is slightly greater than the length of the rollers and (c) they have flanged formed on their bores which are directed axially outward from the bearing.

2. A bearing of claim 1 wherein the rollers are arranged in a cage which is concentrically guided on the collar of the abutment flanges.

References Cited

FOREIGN PATENTS 906,105   9/1962   Great Britain.

MARTIN P. SCHWADRON, Primary Examiner

F. SUSKO, Assistant Examiner